United States Patent

[11] 3,599,370

[72] Inventors Pietro Armata;
 Aurelio Genovese, both of 99 Via Felica Cavalotti, Rome, Italy
[21] Appl. No. 817,307
[22] Filed Apr. 18, 1969
[45] Patented Aug. 17, 1971
[32] Priority Apr. 20, 1968, Dec. 23, 1968
[33] Italy
[31] 36,414A/68 and 42,184A/68

[54] SELF-PROPELLED CONVEYOR DEVICE FOR POSITIONING FISHING GEAR OFFSHORE
 7 Claims, 8 Drawing Figs.
[52] U.S. Cl. .............................................. 43/26.1, 43/27.4, 43/17
[51] Int. Cl. .............................................. A01k 89/00
[50] Field of Search .............................................. 43/26.1, 27.4, 43.11, 43.15

[56] References Cited
UNITED STATES PATENTS

| | | | |
|---|---|---|---|
| 2,693,047 | 11/1954 | Lumsden | 43/26.1 |
| 2,726,471 | 12/1955 | Uus | 43/26.1 X |
| 2,803,914 | 8/1957 | Ellis | 43/26.1 |
| 3,106,796 | 10/1963 | Friedland | 43/26.1 |

*Primary Examiner*—Samuel Koren
*Assistant Examiner*—Daniel J. Leach
*Attorney*—Hofgren, Wegner, Allen, Stellman and McCord ABSTRACT: The conveyor device serves to transport, position and eventually to drop fishing implements at a great distance from the shore, and it comprises a float powered by a motor, and means to carry and drop the fishing implements at the desired location, as well as a line connecting them to the shore, in addition to a second line to recover the float.

PATENTED AUG 17 1971
3,599,370
SHEET 1 OF 2
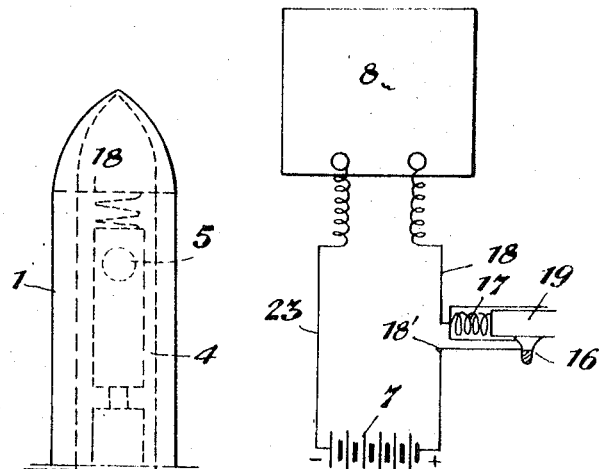
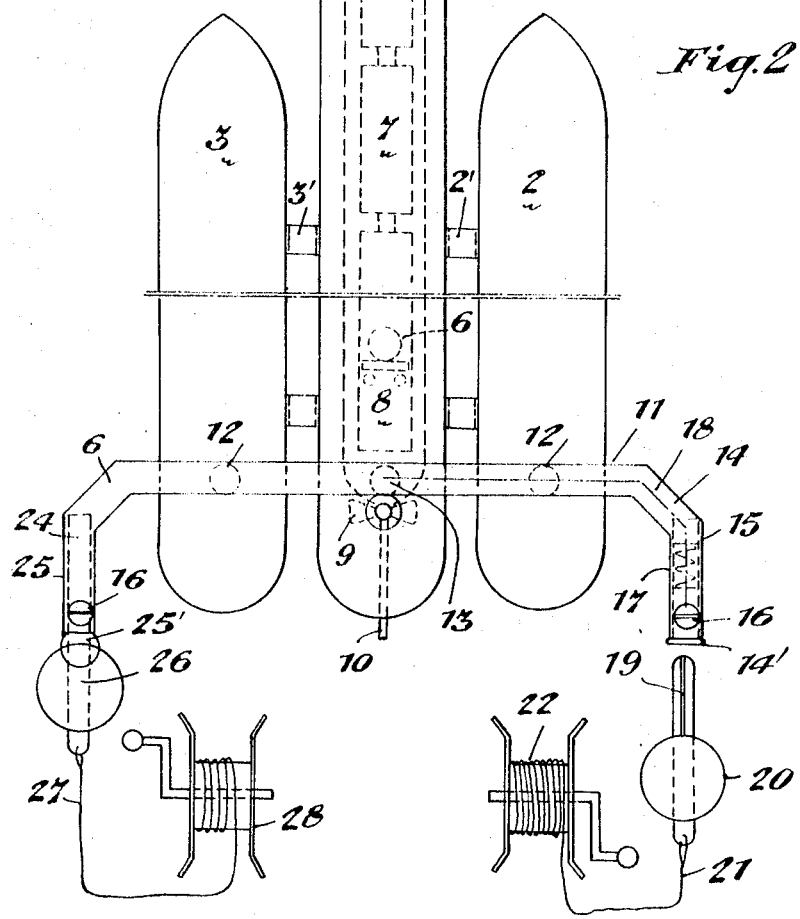
INVENTORS
Pietro Armata,
Aurelio Genovese,
BY Hofgren, Wegner, Allen,
Stellman & McCord ATTORNEYS

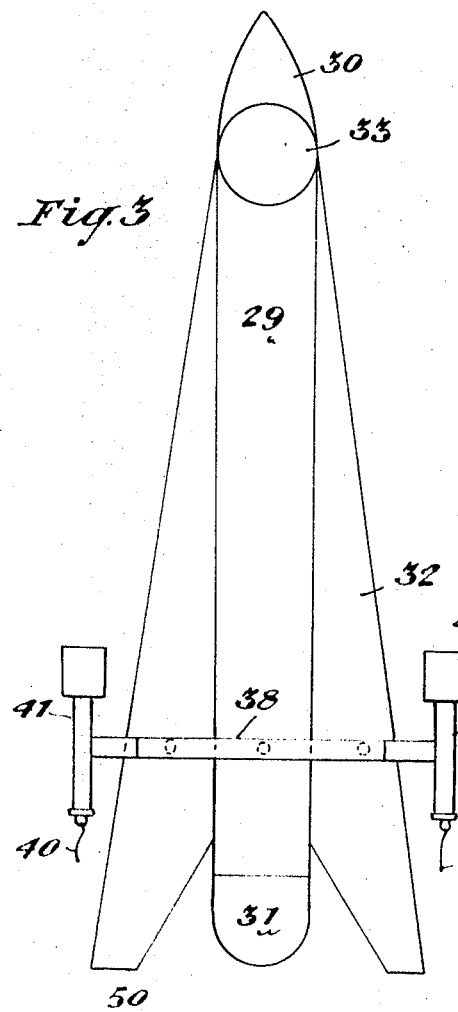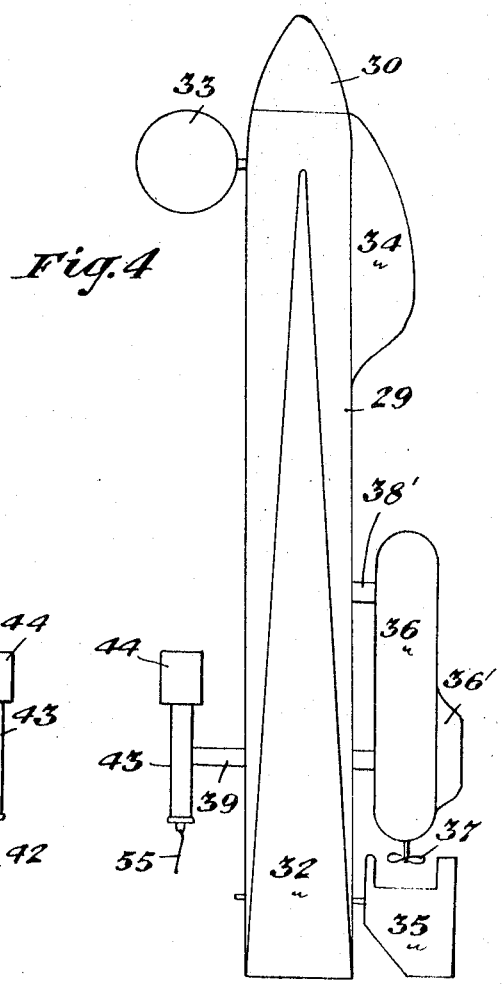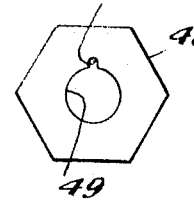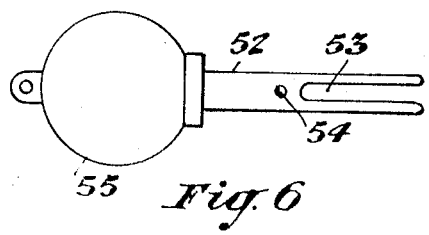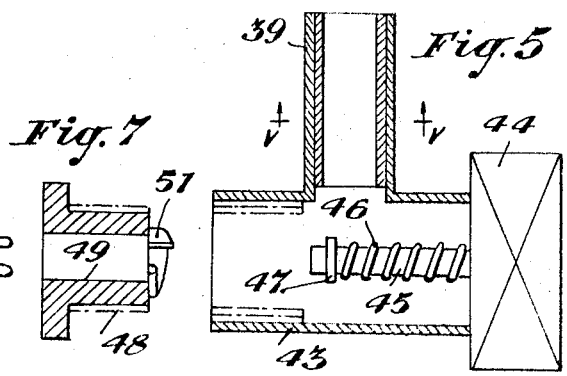

SELF-PROPELLED CONVEYOR DEVICE FOR POSITIONING FISHING GEAR OFFSHORE

The present invention relates to a self-propelled conveying device for positioning and eventually dropping offshore fishing gear of any suitable kind. Essentially, such a conveyor device can be considered as a fishing accessory which permits to extend the reach of the fishing implements to a distance from the shore which could never be attained but with the help of a boat.

Hitherto, fishing from the shore was practically reduced to angling and to a few methods of netting and obviously this also limited the variety and quantity of the catch. Without a boat, it was practically impossible to fish using for instance long lines, or by trolling or drag nets. Boats (also the inflatable ones) represent in many instances not merely a problem of cost, but also of availability or, owing to their size and weight, also of transport. Furthermore, the handling of boats, especially in choppy water, also requires skill and force.

It is therefore an object of the present invention to create a device which permits fishing far offshore without leaving terra firma.

It is an additional object of the invention to create a device of the above description which is light, of reduced size, and therefore can be easily transported and just as easily launched, even from a rocky coast.

A still further object of the invention is to supply a device whose handling and control require neither force nor special skill.

Essentially, the device consists of a self-propelled, remote controlled flowing body which conveys the fishing gear and a line attached to it to a predetermined distance offshore and is equipped with means to drop into position the fishing gear.

The floating device can be made of any suitable shape and type. The same applies to its means of propulsion, which might be an electric or a compressed air motor, a small internal combustion engine or the like. The organs for dropping the fishing implement at the desired location and for recovering the conveyor can be either remote controlled by lines maneuvered from the shore or by radio, or may be actuated by time delay mechanisms mounted on the conveyor.

The device permits the use of a variety of fishing implements. Single hooks, or long lines appear the most convenient, but even drag nets or the like can be applied. These implements can either remain attached to the conveyor during the use, and recovered together with it, or they may be expelled from the conveyor at the desired location and hauled in later by the fishermen. Thus a single conveyor may be used to drop several fishing implements in succession.

For purely illustrative and in no way limitative purpose two embodiments of the invention will now be described with reference to the attached drawings, wherein:

FIG. 1 is a schematic top view of a first embodiment of the invention;

FIG. 2 is a wiring diagram of its electric circuit;

FIG. 3 is a top view of a second embodiment of the invention;

FIG. 4 is a lateral view thereof;

FIGS. 5 to 8 are views of the components of a possible fishing gear releasing mechanism.

The conveyor device shown in FIG. 1 comprises a generally tubular main hull 1, and two lateral, also generally tubular outriggers 2 and 3 fastened to it by connecting pieces 2' and 3'. A watertight casing 4, shown in dotted outlines in FIG. 1, mounted beneath hull 1 by means of tubular joints 5 and 6, houses the storage batteries 7, the electric motor 8 fed by them, to whose shaft (not shown) is keyed or otherwise fastened a propeller 9. A rudder 10 pivoted to the casing or to the main float serves to guide the device towards the desired location.

A yoke or crosspiece 11 extends across the main hull 1 and the outriggers 2 and 3 and is fastened to them by connecting elements 12 and 13. The hollow ends of the yoke are bent abaft. Inside one end (the right-hand end 14 in FIG. 1) of the yoke a bushing 15 of nonconducting material is secured, as by a metal fastener 16, to the yoke wall. Inside the bushing 15 a helical metal spring 17 is electrically connected, as by a wire 18, to one terminal of the motor 8. The spring ends short of the fastener 16, which is connected by a wire 18' to one pole of the battery 7. A spring-loaded lid 14' closes the mouth of the end 14. The fishing implement (not shown), such as a tackle with one or a number of baited hooks, is attached to a metal plug 19 which is weighted at 20, as by a lead ball. The plug 19 is connected by means of line 21 to a winch 22 which remains ashore. The other terminal of motor 8 is connected, as by a wire or the ground 23, to the other pole of the battery.

The plug 19 fits exactly into the bushing 15 and remains engaged in it once it is inserted. Therefore, when it is introduced into the bushing until it compresses spring 17, it closes the contact between the latter and the fastener 16 and thus also the circuit of the motor 8. A similar plug 24 is engageable within the tubular end 25 of yoke 11. Also, this plug 24 is ballasted at 26 to counterbalance weight 20 and connected by a line 27 to a winch 28 which remains ashore. When plug 24 is withdrawn, the inlet opening of end 25 is closed by a spring-loaded lid 25'.

Thus, when both plugs are inserted, the conveyor travels offshore to a distance regulated by paying out line 27. When this distance is reached, plug 19 is extracted from bushing 15 by a pull on line 21 and will sink to the bottom together with the fishing gear attached to it. The extraction of plug 19 also opens the electric circuit of the device and stops the motor 8. Thus, the conveyor can be recovered by hauling in line 27, while the fishing gear is recovered by hauling in line 21 at the desired time.

As already stated, a number of fishing implements can be transported in succession to the desired location with a single conveyor.

The embodiment shown in FIGS. 3 through 8 differs from the one just described by its shape and by the use of an automatic plug ejection device. This embodiment comprises a generally tubular main hull 29 with a cuspidal head 30 and a rounded stern 31, both of which can be rendered detachable. Two lateral floats 32 are fastened to the sides of the main hull 29. The hull 29 may be fitted with a signaling lamp 33, a fin keel 34 and a rudder 35.

A casing 36, which houses the propelling motor and through which passes the shaft of the propeller 37, is fastened, through tubular connecting elements 38', to the underside of the main hull. The fuel, the batteries, the compressed air, in other words, whatever power source is being used, can be also housed in casing 36 or in the interior of the hull 29. The casing 36 is fitted with a bilge 36'.

A tubular cross element 38 is fastened, as by three uprights 39, to the top of the main body and the lateral floats. The plug carrying the line 40 for hauling in the conveyor is engaged in the tubular element 41 at one end of the cross piece 38, while the ejection mechanism for the plug carrying the fishing line 42 is housed in the tubular element 43, which is detachably mounted to the other end of the cross piece 38.

As shown in FIGS. 5 to 8, the ejection mechanism comprises a time delay clock 44 of the usual type, which is mounted at one end of the tubular element 43, with its winding stem 45 extending into the interior of this element 43.

A helical spring 46 is retained on the stem 45 by a pin 47 passed through it. Into the other end of element 43 is screwed a bushing 48, shown in FIGS. 7 and 8. The interior end of the bore 49 of bushing 48 is surrounded by a helical cam surface 51. A groove 50, opening into said bore, extends through the bushing and the cam. The time delay clock is wound up by inserting the hollow shaft 52 of the plug 53 through bore 49 and over the winding stem 45, thereby compressing spring 46 and engaging pin 47 in the slots 53 of shaft 52. The shaft, which fits exactly into bore 49, is fitted with a projecting pin 54, and therefore it can pass through the bushing only when this pin enters slot 50, and can be rotated to wind clock 44 only when said pin has entered beyond the cam surface 51, thereby compressing spring 46. As known, a single rotation of the winding stem charges completely the mechanism of such time delay clocks. While the clock mechanism is running, its stem rotates oppositely to the sense in which it has been wound and entrains by its rotation also the shaft 52. As soon as the pin 54 reaches the groove 50, the spring 46 ejects the shaft 52 together with plug 55 and the fishing implement attached to it.

Preferably, the time delay clock is of the type which also incorporates a switch which closes the circuit of the motor and signal lamp as long as it runs, and opens it when it stops. A conveyor device of this type can eject a fishing implement even at a distance of 800 yards from the shore.

It is understood that the invention is not limited to the two embodiments just described. Thus, the time delay clock can be replaced by any type of remote controlled tripping mechanism. While generally it is more important to convey the fishing gear to a given distance rather than to a given location, it would be obvious to any expert in the art to fit the rudder with a remote controlled mechanism of any type in order to direct the conveyor exactly towards a given spot. All these variants and changes are within the scope of the invention.

We claim:

1. A self-propelled conveyor device for carrying and sinking fishing gear offshore, comprising: a float powered by a motor; first means connected to said fishing gear and to said float; second means to expel said first means from the float; third means to recover said fishing gear after its expulsion; and fourth means to haul said float ashore, said float comprising a main hull containing a propulsion unit and power source therefor; two outriggers fastened to said hull; and a yoke interconnecting said hull and outriggers.

2. A self-propelled conveyor device for carrying and sinking fishing gear offshore, comprising: a float powered by a motor; first means connected to said fishing gear and to said float; second means to expel said first means from the float; third means to recover said fishing gear after its expulsion; and fourth means to haul said float ashore, said first means consisting of a weighted plug detachably secured to said float; said second and third means being a line connecting said plug to the shore; and said fourth means being a line connecting the float to the shore.

3. A device according to claim 2, wherein said second means is a time delay mechanism.

4. A self-propelled conveyor device for carrying and sinking fishing gear offshore, comprising: a float powered by a motor; first means connected to said fishing gear and to said float; second means to expel said first means from the float; third means to recover said fishing gear after its expulsion; fourth means to haul said float ashore, said motor being an electric motor having one terminal connected to one pole of a battery, and the other terminal ending in a spring extending within a nonconductive bushing secured to the float, and a fastener means connecting said bushing to the float being electrically connected to the other pole of said battery, said spring being electrically connected to said fastener by the insertion of said first means and disconnected therefrom by the expulsion of said first means.

5. A self-propelled conveyor device for carrying and sinking fishing gear offshore, comprising: a float powered by a motor; first means connected to said fishing gear and to said float; second means to expel said first means from the float; third means to recover said fishing gear after it expulsion; fourth means to haul said float ashore, said float comprising a main hull, two lateral floats fastened to its sides, and a casing fastened beneath said hull and containing at least a propulsion unit, and a cross piece interconnecting said main hull and lateral floats and carrying said first, said second and fourth means, said cross piece ending in at least one tubular element.

6. A device according to claim 3, wherein said time delay mechanism comprises a time delay clock mounted at one end of a tubular element secured to the float, the winding stem of said clock extending within the interior of said tubular element, a bushing applied to the opposite end of said element, a groove opening into the bore of said bushing and extending therethrough, a plug connected to the fishing gear and to its haul-in line, said plug having a hollow shaft engageable through said bushing with the winding stem to charge said clock and compress said spring, and a pin projecting from said shaft to permit the introduction and the expulsion of said shaft by the spring only when the pin, during the winding and unwinding of the clock, reaches said groove.

7. A self-propelled conveyor device for carrying and sinking fishing gear offshore comprising: a float powered by a motor; said float including a central section, outwardly spaced balancing members, a yoke on said float, first means connected to said fishing gear and to one end of said yoke, second means to expel said first means from said float, third means to recover said fishing gear after its expulsion, and fourth means fixed to the other end of said yoke to haul said float ashore.